United States Patent [19]

Suga

[11] Patent Number: 5,138,630
[45] Date of Patent: Aug. 11, 1992

[54] DIRECT CURRENT ELECTRIC ARC FURNACE

[75] Inventor: Yoshizo Suga, Kawasaki, Japan

[73] Assignee: NKK Corporation, Tokyo, Japan

[21] Appl. No.: 608,578

[22] Filed: Nov. 2, 1990

[30] Foreign Application Priority Data

Nov. 6, 1989 [JP] Japan .................................. 1-287364

[51] Int. Cl.⁵ .......................................... H05B 7/144
[52] U.S. Cl. ................................... 373/107; 373/101;
 373/102; 373/104; 373/105; 373/108
[58] Field of Search ............... 373/107, 104, 105, 102,
 373/108, 60, 62, 65, 66, 72, 75, 81, 88

[56] References Cited

U.S. PATENT DOCUMENTS

| | | | |
|---|---|---|---|
| 3,789,127 | 1/1974 | Bowman | 373/108 |
| 3,949,151 | 4/1976 | Kerton | 373/108 |
| 4,079,185 | 3/1978 | Collin | 373/108 |
| 4,461,010 | 7/1984 | Titus | 373/108 |

FOREIGN PATENT DOCUMENTS 3541294 6/1986 Fed. Rep. of Germany ...... 373/108

*Primary Examiner*—Bruce A. Reynolds
*Assistant Examiner*—Tu Hoang
*Attorney, Agent, or Firm*—Frishauf, Holtz, Goodman & Woodward

[57] ABSTRACT

A direct current electric arc furnace comprises a main body, a moving electrode attached at the center of a roof of the furnace which generates an arc under the moving electrode, a bottom electrode attached at the center of the bottom, conductors which are connected to the bottom electrode, so that the deviation of the arc caused by a magnetic field originated at the outside of the main body is cancelled by another magnetic field caused by the conductors when electric currents are fed to the conductors and means of feeding direct currents to the conductors.

6 Claims, 4 Drawing Sheets

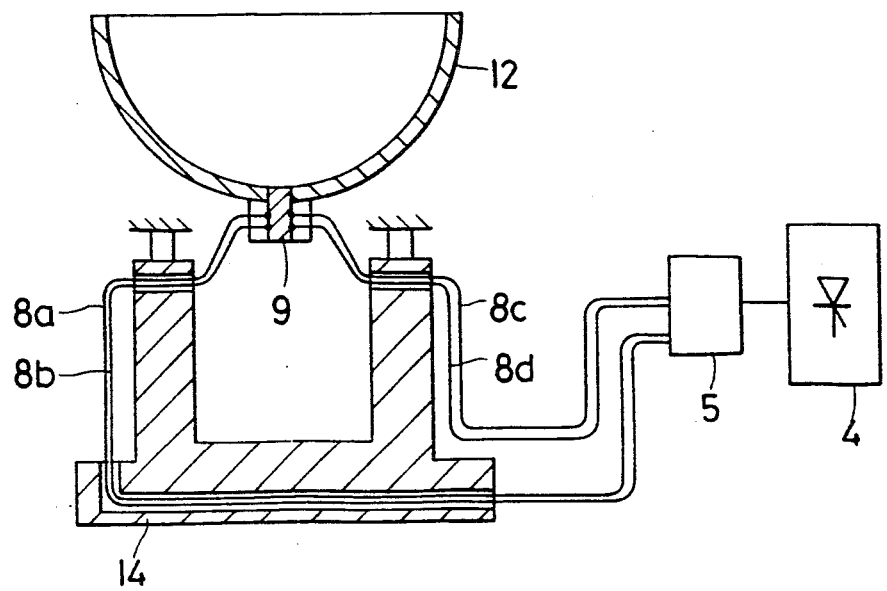
Fig. 2
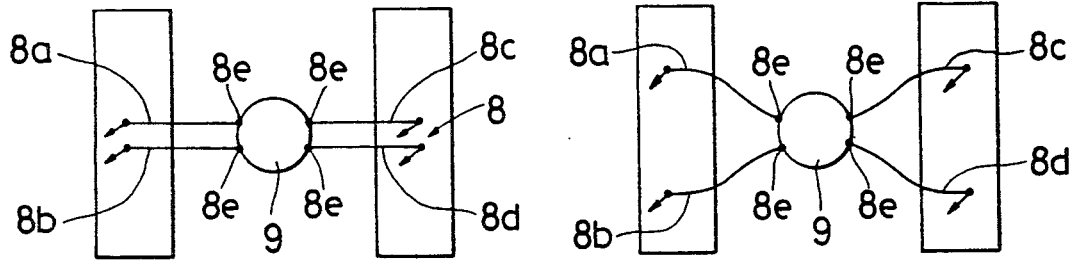
Fig. 3A　　　　　　　　Fig. 3B
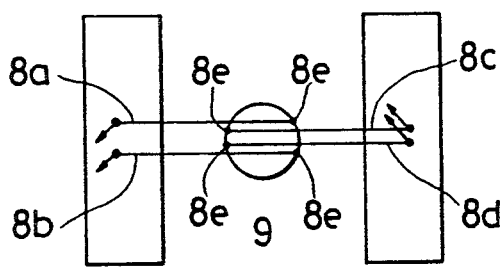 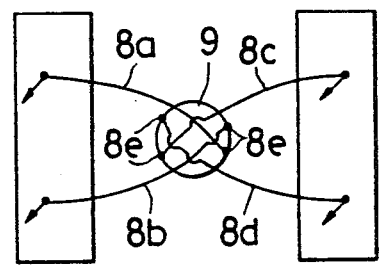
Fig. 3C　　　　　　　　Fig. 3D

DIRECT CURRENT ELECTRIC ARC FURNACE

BACKGROUND OF THE INVENTION

1. Field of the Invention

The invention relates to the field of metallurgy. The invention relates to the field of a direct current electric arc furnace.

2. Description of the Related Art

Formerly alternating current electric arc furnaces have mainly been utilized for electric furnaces wherein the melting and refining of metals are carried out.

Recently the electric arc furnace is being switched from an alternating current type to a direct current type since the capacity of semiconductors for power supply is enhanced and the cost thereof is lowered. The direct current electric arc furnace is superior to the alternating electric current arc furnace in the efficiency of power supply, the consumption of electrodes of the furnace and the consumption of electricity.

The feeding system of the direct current electric arc furnace is the same with that of the alternating current electric arc furnace in power supply to transformers. The voltage is lowered by the transformers and the alternating current is rectified to the direct current by a rectifier such as a thyrister. In the rectifying system of the thyrister direct current reactors are attached to the direct current circuit to prevent rapid increase of electric current when the system is shortcircuited. This direct current system is composed of an anode side conductor which leads to a bottom electrode of the furnace and a cathode side conductor which leads to a movable carbon electrode of the furnace.

The rectifier circuit rectifies the alternating current by dividing the current to 2 or 4, which constitutes 12 or 24 phased current respectively, to prevent higher harmonics hazard. The rectified currents are connected to the conductors in parallel connection.

In case of the alternating current electric arc furnace three elecrodes are used wherein three phase alternating current is supplied to the electrodes.

In case of the direct current electric arc furnace a single movable electrode can be used so far as the current is in the range allowable for the movable electrode. Therefore the facility around the movable electrode is simple but a bottom electrode is required. In the direct current electric arc furnace, by placing an electrode at the center of the furnace, uniform melting is carried out which decreases the consumption of electricity and refractories.

FIG. 6 is an explanatory view of the feeding system of a conventional direct current arc furnace. As shown in FIG. 6 the electricity supplied from a main supply is fed to the transformer 3 via the disconnecting switch 1 and the circuit breaker 2. This is the case wherein 24-phase alternating current is rectified utilizing four sets of the tansformer 3 which lowers the voltage. The secondary side terminals of the transformer 3 are connected to the input terminals of the phase selectable thyrister, or the thyrister 4. The minus side terminals of the thyrister 4 are connected to the moving electrode 7 via the feeding conductor 6 and the plus side terminals thereof are connected to the bottom electrode 9 via the direct current reactor 5 and the feeding conductor 8. The holder arm 10 holds the movable electrode 7 and moves it up and down. The main body 12 contains the steel bath 11.

In this conventional direct current electric arc furnaces, when the capacity of the furnace is enhanced, the feeding conductors 6 and 8 should be arranged at the place wherein the cost of the installation of these conductors is decreased or at the place where the conductor 8 does not interfere with the cooling facility attached in the vicinity of the bottom electrode 9.

In this arrangement the magnetic field caused by the electric current flowing in the conductors 6 and 8 and the magnetic field caused by the arc under the moving electrode 7 interfere with each other which gives rise to the deviation of the arc. In this case the deviation is towards the feeding facility.

Accordingly the reaction in the furnace is accelerated at the deviated side and retarded at the opposite side. Hence the uniform reaction is not attainable. The deviated distance from under the arc is proportional to the intensity of the arc current. When the arc current is over 40 kiloampere, the deviated distance is significant. It is very difficult to arrange the bottom electrode 9 and the feeding conductors 6 and 8 symmetrically with respect to the horizontal and the vertical position. Therefore due to the deviation of the arc the uniform melting is not possible.

SUMMARY OF THE INVENTION

It is an object of the present invention to provide a direct current electric arc furnace. It is an object of the present invention to provide a direct current electric arc furnace wherein the arc is stabilized at the center of the furnace.

The invention provides a direct current electric arc furnace comprising:

a main body of said direct current electric arc furnace which contains raw materials;

a moving electrode attached at the center of a roof of the direct current electric arc furnace which generates an arc under said moving electrode;

a bottom electrode attached at the center of a bottom of the direct current electric arc furnace;

a plurality of conductors which are connected to said bottom electrode, so that the deviation of said arc caused by a magnetic field originated at the outside of said main body is cancelled by a second magnetic field caused by said plurality of conductors when electric currents are fed to the plurality of conductor and means of feeding a plurality of direct currents to said plurality of conductors.

The horizontal directions of the conductors can be symmetrical with respect to the center of said bottom of the direct current electric arc furnace.

Means of controlling said plurality of direct currents may be added.

The number of the plurality of the conductors may be two or four.

BRIEF DESCRTIPTION OF THE DRAWING

FIG. 2 is a sectional side view of the feeding system of an embodiment of the invention;

FIGS. 3A, 3B, 3C and 3D are schematic illustrations of the horizontal arrangement of the feeding conductors of an embodiment of the invention.

DESCRIPTION OF THE PREFERRED EMBODIMENT

The steel making operation in electric arc furnaces is divided into two stage; the melting stage wherein the raw material such as scrap is melted and the refining stage wherein the steel is refined. Generally speaking at the melting stage the raw material is accelerated to melt by a long arc operation wherein the radiation heat of the arc is utilized. At this stage of operation, when the arc is deviated off the center of the furnace, the melting of the raw material is accelerated at the deviated side of the furnace, which gives rise to the non uniform melting or damage to the refractory.

To evade the deviation of the arc this invention provides a plurality of feeding conductors arranged in the vicinity of the bottom electrode, of which directions may be symmetrical with respect to the center of the furnace or random. The currents running in the feeding conductors are preset by proportional current setters to evade the deviation which is caused by the design of the feeding system of the furnace.

By feeding currents to these conductors the magnetic field caused by these currents can cancel the magnetic field originated from the outside of the furnace.

Means of controlling said plurality of direct currents may be added.

The number of the plurality of the conductors may be two or four. When the number of the conductors is an odd number, there is a technical difficulty in installing the power supply. When the number is more than four, the cost of the installation is excessive to justify the investment.

EXAMPLE

Figure 1:
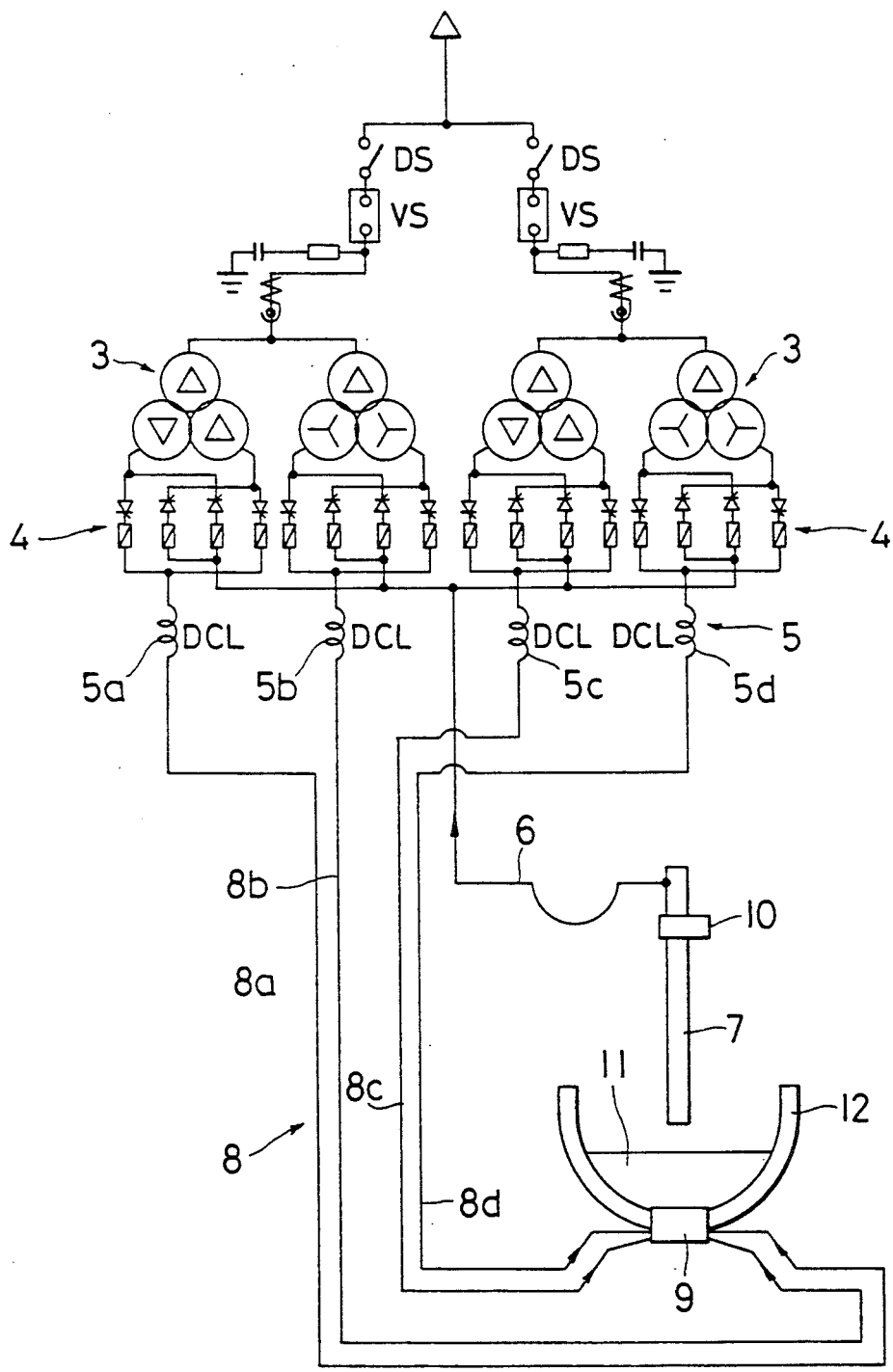
FIG. 1 is a circuit diagram of an embodiment of the feeding system of a direct current electric arc furnace of the invention.
Figure 6:
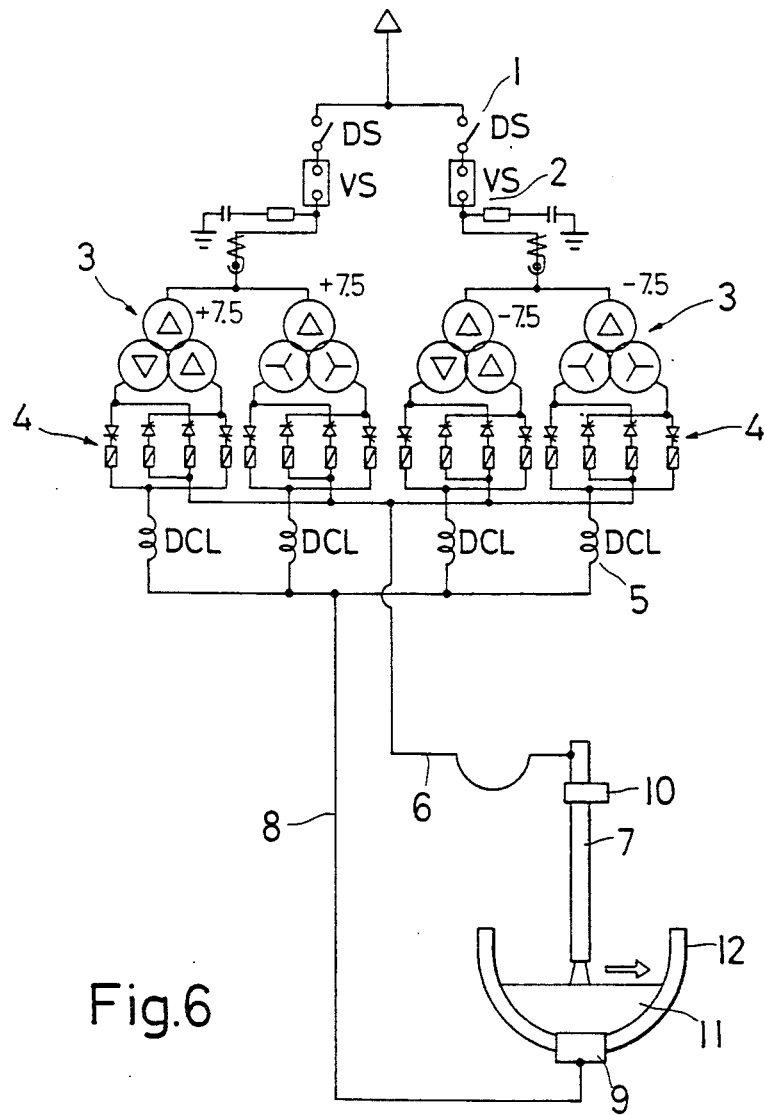
FIG. 6 is an explanatory view of the feeding system of a conventional direct current arc furnace.

FIG. 1 is a circuit diagram of an embodiment of the feeding system of a direct current electric arc furnace of the invention. In FIG. 1 the numbers from 1 to 12 denote the same or the corresponding elements as shown in FIG. 6.

FIG. 2 is a sectional side view of the feeding system of an embodiment of the invention. FIGS. 3A, 3B, 3C and 3D are schematic illustrations of the horizontal arrangement of the feeding conductors of an embodiment of the invention. As shown in FIG. 1, FIG. 2 and FIGS. 3A to 3D, the feeding conductor 8 is devided into 8a, 8b, 8c and 8d. The conductors 8a and 8b are led to the bottom electrode 9 via the basement 14 and the conductor 8c and 8d are directly led to the electrode bottom 9. The directions of the four conductors in the vicinity the bottom electrode may be symmetrical with respect to the center of furnace or may be random. In case of the conductor connection shown in FIGS. 3A and 3B, the feeding conductors 8a to 8d are connected to the terminals 8e of the bottom electrode without placing the parts of the feeding conductors under the bottom electrode in parallel or crossing each other. In case of the conductor connection shown in FIGS. 3C and 3D, the feeding conductors 8a to 8d are connected to the terminals 8e of the bottom electrode placing the parts of the feeding conductors under the bottom electrode in parallel or crossing each other.

In case of the conductor connection shown in FIGS. 3A and 3B, there is no magnetic interference among the parts of the conductors 8a to 8d under the bottom electrode. In case of the conductor connection shown in FIGS. 3C and 3D, there is magnetic interference among the parts of the conductors 8a to 8d under the bottom electrode. Therefore in case of the conductor connection shown in FIGS. 3C and 3D, the magnetic field under the bottom electrode is cancelled by these conductors and the intensity of the magnetic field of the conductors can be altered by changing the connection of the conductors to the terminals of the bottom electrode.

Figure 4:
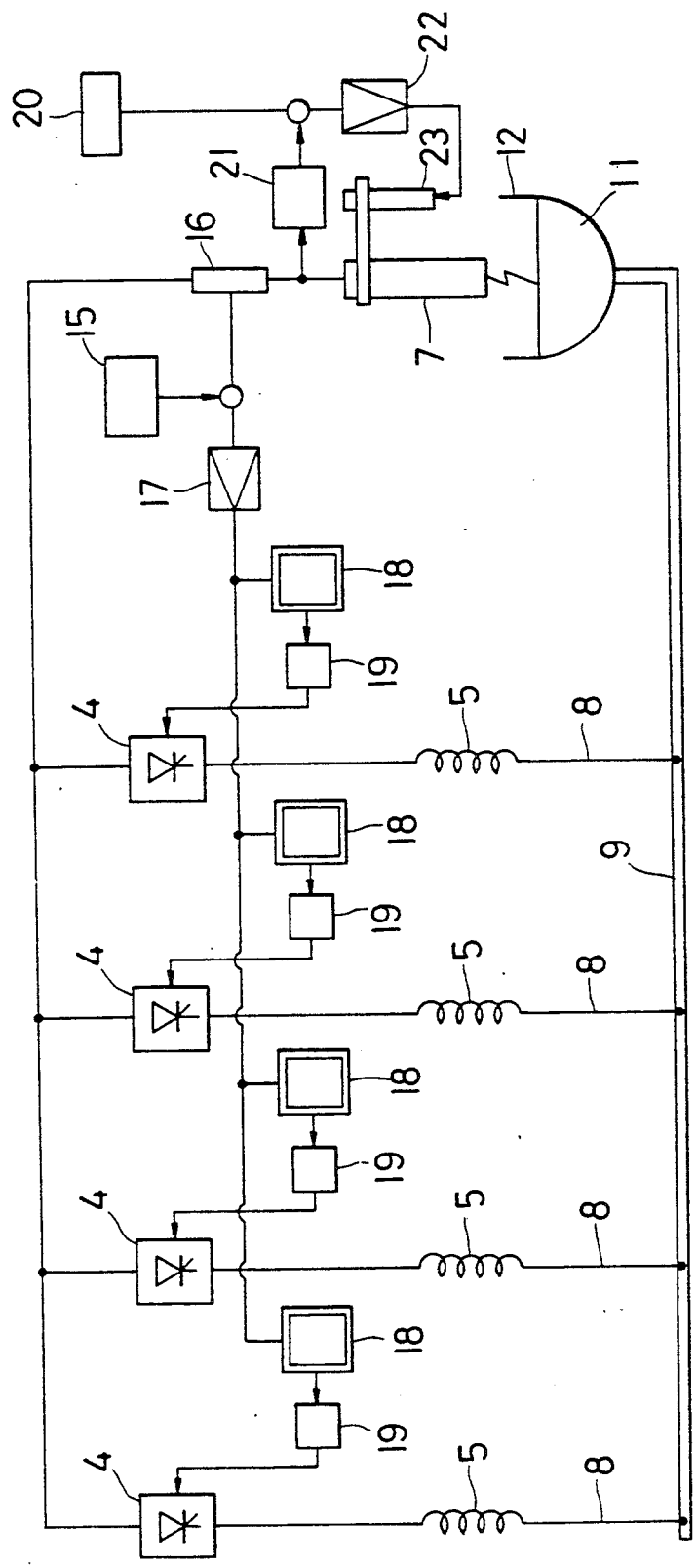
FIG. 4 is a circuit diagram of the feeding circuit of an embodiment of the invention.

FIG. 4 is a circuit diagram of the feeding circuit of an embodiment of the invention. In FIG. 4, the numbers 4, 5, 8, 9 and 11 denote the same or the corresponding elements in FIG. 1. Number 15 denotes the current setter of the anode feeding circuit; 16, the current detector; 17, the amplifier; 18, the proportional current setter; 19, the phase controller; 20, the voltage setter; 21, the voltage detector; 22, the voltage amplifier; and 23, the elecrode position controller.

The voltage setter 20 sends the signal of the preset value of the voltage required for controlling the position of the moving electrode 7 to a comparator wherein the preset value is compared with the actual value detected by the voltage detector 22 and the difference between the preset value and the actual value is sent to the amplifier 22. The output of the amplifier is sent to the electrode position controller 23 which controls the position of the moving electrode 7.

The arc under the moving electrode 7 is an electromagnetic fluid and deviated by the magnetic field caused by the feeding conductors. The deviation of the arc in a direct current electric arc furnace is strongly influenced by the magnetic field caused by the conductor 8 which is situated in the vicinity of the bottom electrode 9 since the conductor is in the vicinity of the arc.

In a direct current electric arc furnace shown in FIGS. from 1 to 4, the values of the feeding currents leading to the terminals 8e of the bottom electrode, which are symmetrically arranged with respect to the center of the bottom electrode, are set constant by adjusting the proportional current setter by which the feeding currents are regulated to preset values. The bias signal between the preset value and the actual value of the current is detected by the current setter 15 and the current detector 18 and sent to the proportional current setter 18 via the amplifier 17 as the control signal.

The proportial current setter 18 superposes the control signal on the preset value and sent the added value to the thyrister 4 via the phase controller 19. The thyristers 4 sent the direct currents to the feeding terminals 8e via the direct current reactors 5a to 5d and the feeding conductors 8a to 8d.

Figure 5:
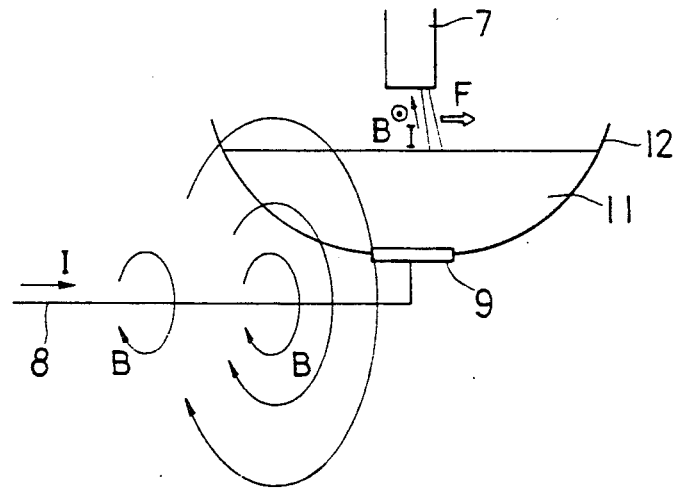
FIG. 5 is an explanatory view describing the effect of conductors on the deviation of arc.

FIG. 5 is an explanatory view describing the effect of conductors on the deviation of arc. As shown in FIG. 5 the feeding conductor generates the magnetic field B which influences on the current I of the arc between the moving electrode 7 and the steel bath 11, and exerts a force F on the arc and deviates the position. In this case the direction of the deviation is the same with that of the current.

According to the principle explained by FIG. 5, when the currents in the feeding conductors 8a to 8d is controlled to prevent the deviation of the arc, the uniform melting of the steel bath 11 is carried out.

What is claimed is:

1. A direct current electric arc furnace comprising:

a main body of said direct current electric arc furnace which contains raw materials;

a moving electrode attached at a center of a roof of the direct current electric arc furnace which generates an arc under said moving electrode;

a bottom electrode attached at a center of a bottom of the direct current electric arc furnace;

a plurality of conductors which are connected to said bottom electrode, whereby a deviation of said arc caused by a magnetic field originated outside of said main body is cancelled by a second magnetic field caused by said plurality of conductors when electric currents are fed to said plurality of conductors; and means for feeding a plurality of respective direct currents to said plurality of conductors;

said conductors having horizontally extending portions which are arranged symmetrical with respect to the center of said bottom of the direct current electric arc furnace.

2. The direct current electric arc furnace of claim 1, further comprising means for controlling said plurality of respective direct currents.

3. The direct current electric arc furnace of claim 2, wherein the number of the plurality of the conductors is two.

4. The direct current electric arc furnace of claim 1, wherein the number of the plurality of the conductors is four.

5. The direct current electric arc furnace of claim 1, wherein the number of the plurality of the conductors is two.

6. A direct current electric arc furnace comprising:

a main body of said direct current electric arc furnace which contains raw materials;

a moving electrode attached at a center of a roof of the direct current electric arc furnace which generates an arc under said moving electrode;

a bottom electrode attached at a center of a bottom of the direct current electric arc furnace;

four conductors which are connected to said bottom electrode, so that a deviation of said arc caused by a magnetic field originated outside of said main body is cancelled by a second magnetic field caused by said four conductors when electric currents are fed to said conductors;

means for feeding respective direct currents to said four conductors;

said four conductors having horizontal extending portions arranged symmetrical with respect to the center of said bottom of the direct current electric arc furnace; and means for controlling said direct currents.

* * * * *